(12) United States Patent
Yang et al.

(10) Patent No.: US 10,677,578 B2
(45) Date of Patent: Jun. 9, 2020

(54) LEVELNESS MEASURING DEVICE AND LEVELNESS MEASURING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Wei-Da Yang, New Taipei (TW); Xiao-Ming Lv, Shenzhen (CN); Shu-Fa Jiang, Shenzhen (CN); Guo-Hua Wu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 258 days.

(21) Appl. No.: 15/951,304

(22) Filed: Apr. 12, 2018

(65) Prior Publication Data

US 2019/0204061 A1 Jul. 4, 2019

(30) Foreign Application Priority Data

Dec. 29, 2017 (CN) .......................... 2017 1 1484685

(51) Int. Cl.
| | |
|---|---|
| *G01B 5/24* | (2006.01) |
| *G01B 7/30* | (2006.01) |
| *G01B 11/30* | (2006.01) |
| *G06F 17/12* | (2006.01) |
| *G01C 19/04* | (2006.01) |
| *G01B 11/26* | (2006.01) |
| *G01B 17/08* | (2006.01) |

(52) U.S. Cl.
CPC ................ *G01B 5/24* (2013.01); *G01B 7/30* (2013.01); *G01B 11/26* (2013.01); *G01B 11/306* (2013.01); *G01B 17/08* (2013.01); *G01C 19/04* (2013.01); *G06F 17/12* (2013.01)

(58) Field of Classification Search
CPC ...... G01B 11/26; G01B 11/306; G01B 17/08; G01B 5/24; G01B 7/30
USPC ......................................................... 33/503
See application file for complete search history.

(56) References Cited

U.S. PATENT DOCUMENTS

| | | | | |
|---|---|---|---|---|
| 5,110,202 A | * | 5/1992 | Dornbusch .......... | G01C 15/002 356/3.12 |
| 7,127,821 B1 | * | 10/2006 | Weisz .................... | G01B 11/14 33/277 |
| 8,136,259 B2 | * | 3/2012 | Torri ...................... | G01B 21/26 33/203.18 |

(Continued)

*Primary Examiner* — Yaritza Guadalupe-McCall
(74) *Attorney, Agent, or Firm* — ScienBiziP, P.C.

(57) ABSTRACT

A levelness measuring system can be applied to a levelness measuring device, the device including an rail, a distance detector, and an angle detector. Both the distance detector and the angle detector are installed on the rail. The system includes a coordinate system establishing module, a distance measurement controlling module, a data fitting module, a plane equation calculating module, a first angle calculating module, an angle measurement controlling module, a second angle calculating module, and a display controlling module. A coordinate system in three dimensions is applied to an inaccessible or difficult surface such that direct contact is not required. A processor of a computer performs instructions to provide the functions of the levelness measuring system including a display.

10 Claims, 7 Drawing Sheets

(56) References Cited

U.S. PATENT DOCUMENTS

| | | | | |
|---|---|---|---|---|
| 2005/0217126 A1* | 10/2005 | Inoue | ............ | G01D 5/04 |
| | | | | 33/1 PT |
| 2008/0244920 A1* | 10/2008 | Stegmaier | ............ | E02F 3/847 |
| | | | | 33/285 |
| 2019/0154439 A1* | 5/2019 | Binder | ............ | G01B 11/26 |
| 2019/0204061 A1* | 7/2019 | Yang | ............ | G01B 17/08 |

* cited by examiner

LEVELNESS MEASURING DEVICE AND LEVELNESS MEASURING METHOD

FIELD

The subject matter relates to a levelness measuring device with a levelness measuring system and a levelness measuring method with the levelness measuring system.

BACKGROUND

Levelness refers to an angle between a to-be-measured surface and an absolute horizontal plane. The levelness of the to-be-measured surface can be measured by levelness measuring devices. The levelness measuring devices include bubble levels and electronic level meters. However, the levelness measuring devices need to be in contact with the to-be-measured surface in operation. Thus, it is difficult to measure the levelness of the to-be-measured surfaces that are not accessible or inconvenient to reach using the levelness measuring devices.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

One definition that applies throughout this disclosure will now be presented.

The term "comprising," when utilized, means "including, but not necessarily limited to"; it specifically indicates open-ended inclusion or membership in the so-described combination, assembly, series, and the like.

Figure 1:
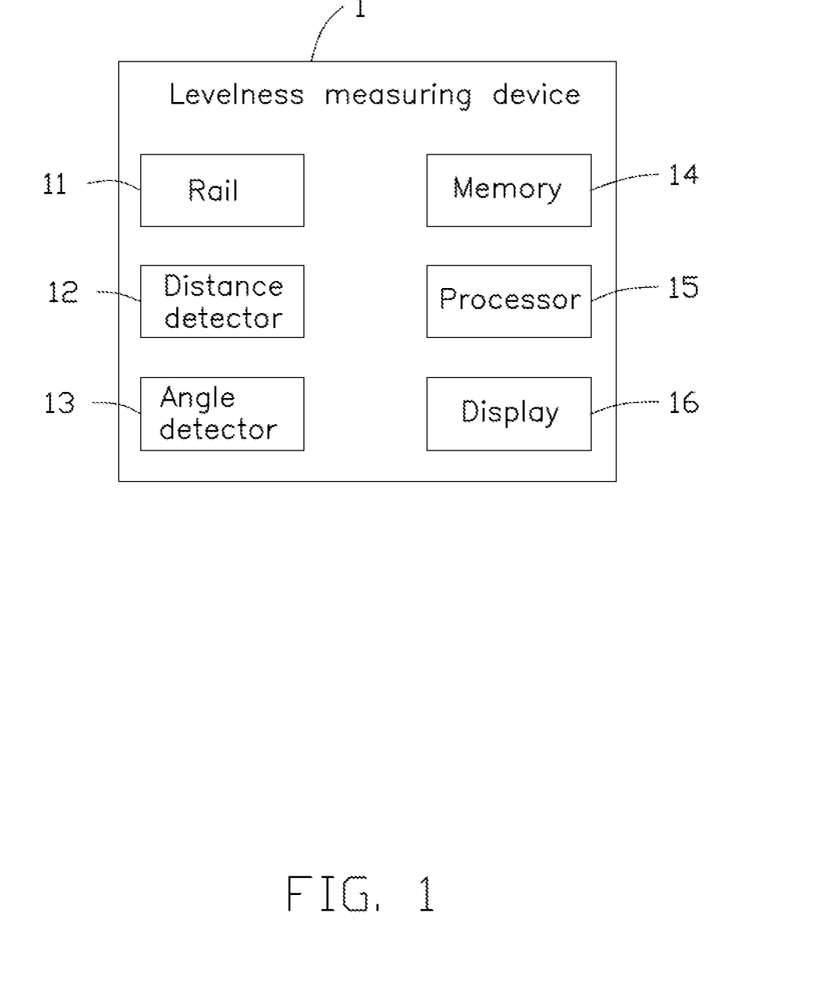
FIG. 1 is a diagram of a levelness measuring device of an exemplary embodiment.

FIG. 1 illustrates an exemplary embodiment of a levelness measuring device 1. The levelness measuring device 1 includes a rail 11, a distance detector 12, an angle detector 13, a memory 14, a processor 15, and a display 16.

In the exemplary embodiment, the rail 11 is L-shaped.

The distance detector 12 is positioned on the rail 11, and is movable along the rail 11. In the exemplary embodiment, the distance detector 12 can perform non-contact measurement on a to-be-measured surface. For example, the distance detector 12 can be a laser sensor or an ultrasonic sensor.

The angle detector 13 is positioned on the rail 11, and can measure an angle $\gamma$ between the plane (hereinafter, "reference plane c") of the rail 11 and an absolute horizontal plane a (in FIG. 6). In the exemplary embodiment, the angle detector 13 is a three-axis gyroscope.

The memory 14 is configured to store a levelness measuring system 10 (shown in FIG. 2) that can facilitate the measuring of the levelness of the to-be-measured surface b.

Figure 2:
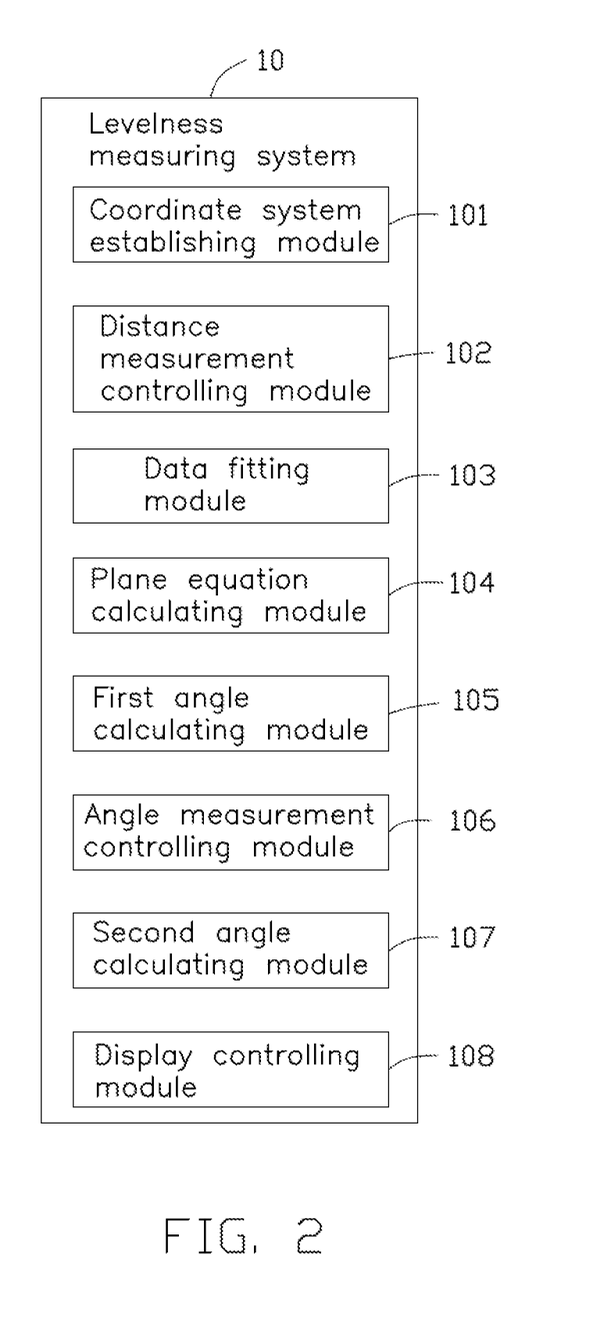
FIG. 2 is a block diagram of a levelness measuring system applied to the levelness measuring device of FIG. 1.

Referring to FIG. 2, the levelness measuring system 10 comprises a coordinate system establishing module 101, a distance measurement controlling module 102, a data fitting module 103, a plane equation calculating module 104, a first angle calculating module 105, an angle measurement controlling module 106, a second angle calculating module 107, and a display controlling module 108. In the exemplary embodiment, the modules 101 to 108 are a collection of software instructions which can be executed by the processor 15 to perform the functions of the levelness measuring system 10.

Figure 3A:
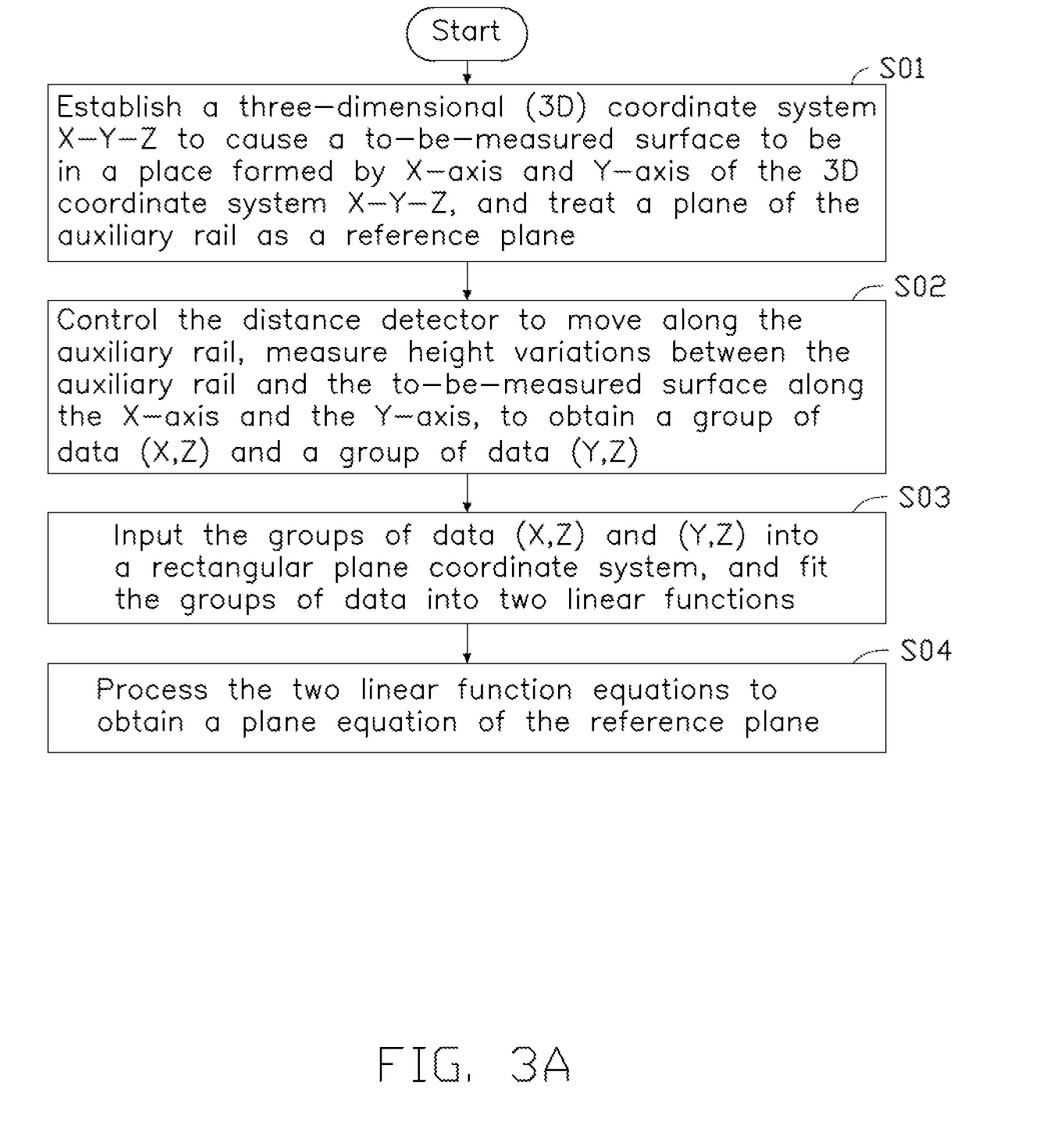
FIG. 3 is a flowchart of a levelness measuring method of an exemplary embodiment.
Figure 3B:
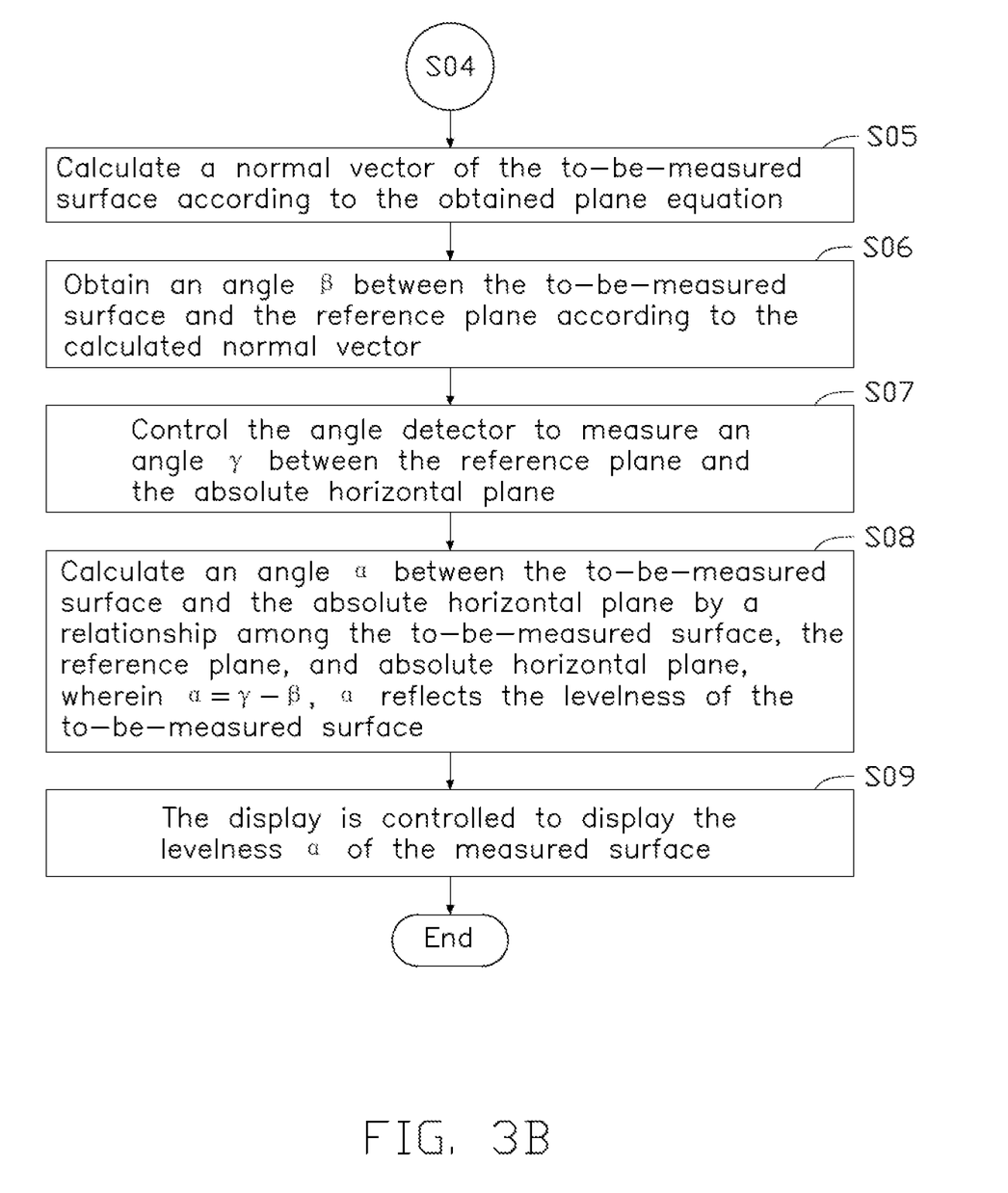

Referring to FIG. 3, a levelness measuring method is provided to measure the levelness of the to-be-measured surface b of an object. The method is provided by way of example, as there are a variety of ways to carry out the method. The method described below can be carried out using the configurations illustrated in FIGS. 1-2, for example, and various elements of these figures are referenced in explaining example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block S01.

Figure 4:
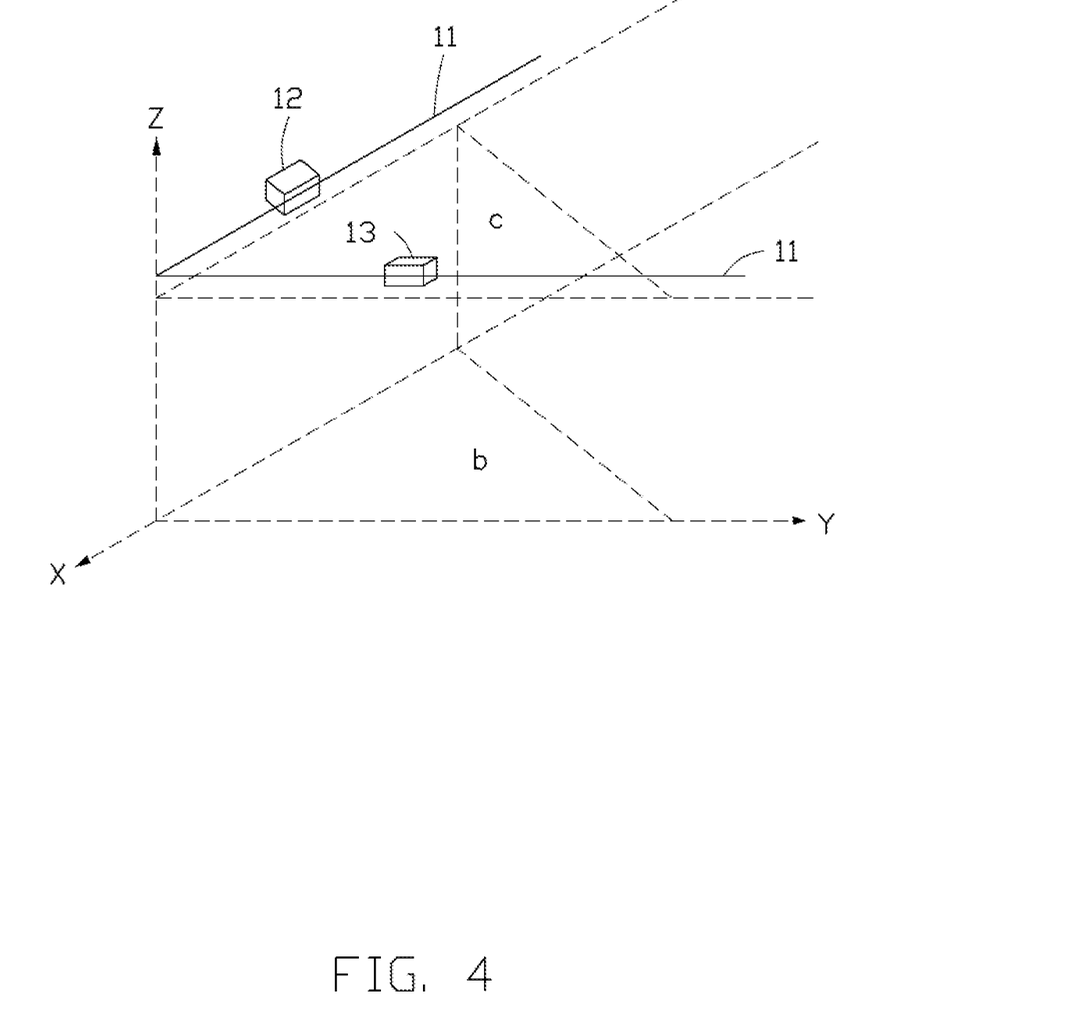
FIG. 4 is a diagram of the establishment of a 3D coordinate system on a to-be-measured surface in the method of FIG. 3.

At step S01, the coordinate system establishing module 101 establishes a three-dimensional (3D) coordinate system X-Y-Z which can be superimposed on a to-be-measured surface b. An X-axis and a Y-axis of the 3D coordinate system X-Y-Z thus enable a plane of the rail 11 to be treated as a reference plane c.

At step S02, the distance measurement controlling module 102 controls the distance detector 12 to move along the rail 11, thereby controlling distance detector 12 to measure height variations between the rail 11 and the measured plane b along the X-axis and the Y-axis. Data group (X,Z) and data group (Y,Z) can thus be obtained. In this exemplary embodiment, the distance measurement controlling module 102 can further store the groups of data in the memory 14.

Figure 5:
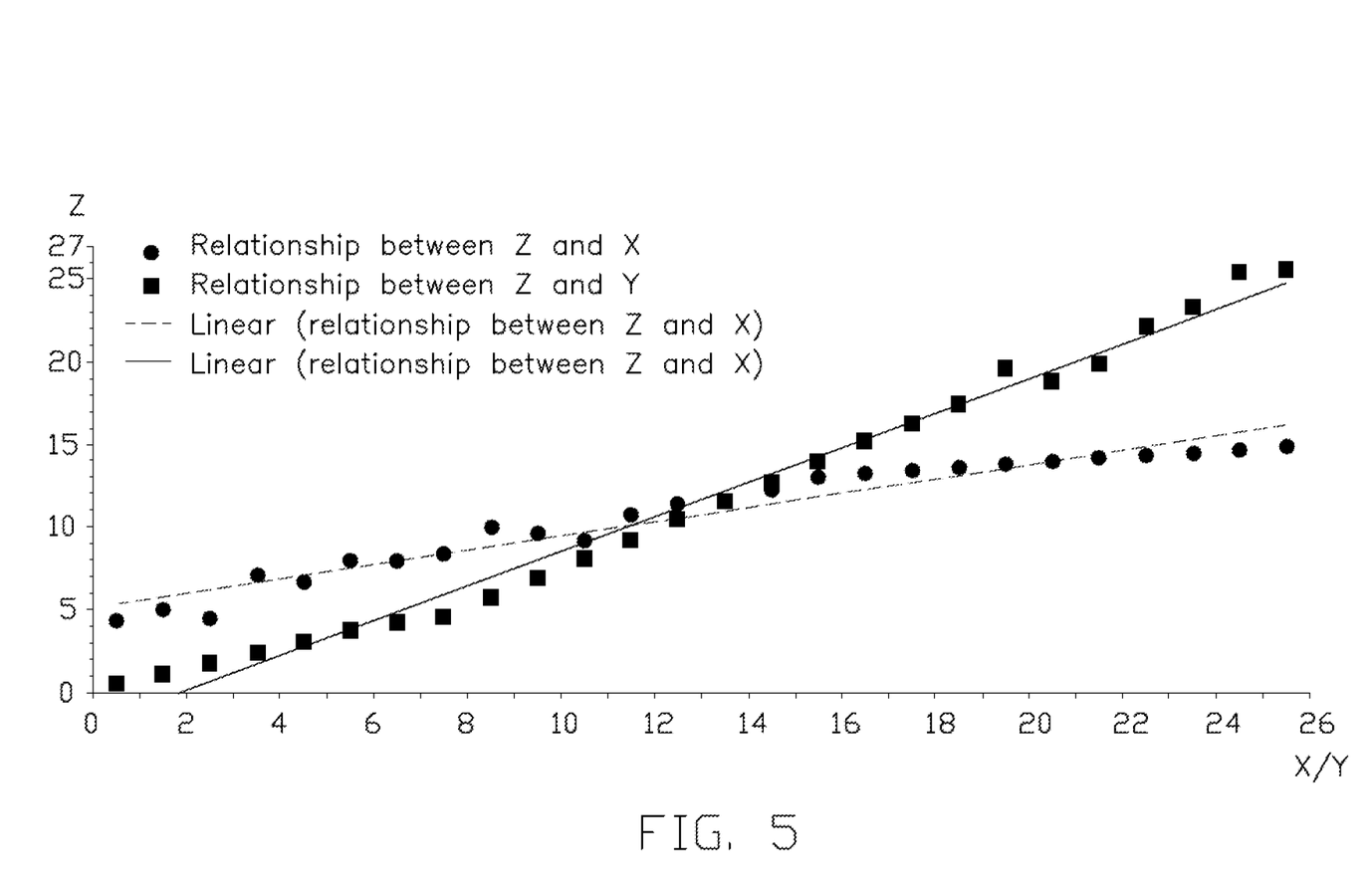
FIG. 5 is a diagram showing the fitting of measured data in a space rectangular coordinate system in the method of FIG. 3.

At step S03, referring to FIG. 5, the data fitting module 103 inputs the groups of data (X,Z) and (Y,Z) into a rectangular plane coordinate system, and arranges the groups of data into two linear functions:

$$\begin{cases} a_1X + b_1Z + c_1 = 0 \\ a_2Y + b_2Z + c_2 = 0 \end{cases}.$$

Wherein, $a_1$, $a_2$, $b_1$, $b_2$, $c_1$, and $c_2$ are constants.

In the exemplary embodiment, the data fitting module 103 obtains the two linear function equations through a linear fitting method. The linear fitting method can process the data with a certain degree of fault tolerance. For uneven surfaces (rough, concave and convex, small amounts of dirt, etc.), deviation data can be isolated to ensure the accuracy of data statistics, to obtain a more satisfactory result.

At step S04, the plane equation calculating module 104 processes the two linear function equations to obtain a plane equation of the reference plane c:

$$AX+BY+CZ+D=0.$$

In this exemplary embodiment, the plane equation calculating module 104 extracts two points from each of the two linear equations, and substitutes the coordinates of the two points into the plane equation, to obtain the values of the constants A, B, C, and D, thereby obtaining the plane equation.

At step S05, the plane equation calculating module 104 obtains the normal vector from the plane equation:

$$\vec{c}=(A,B,C).$$

Specifically, two arbitrary points P (x1, y1, z1) and Q (x2, y2, z2) are obtained in the obtained plane, and a direction vector of any straight line PQ in the plane: $\vec{PQ}$=(x2−x1, y2−y1, z2−z1), so $$\begin{aligned}\vec{c}*\vec{PQ} &= A(x2-x1)+B(y2-y1)+C(z2-z1)\\ &= Ax2+By2+Cz2+D-(Ax1+By1+Cz1+D)\\ &= 0+0.\end{aligned}$$

Because $\vec{c}*\vec{PQ}$=0, the $\vec{c}$ is perpendicular to the plane b, the $\vec{c}$ is the normal vector of the reference plane c. The normal vector of the reference plane c is $\vec{c}$=(A,B,C).

At step S06, the first angle calculating module 105 calculates the normal vector of the to-be-measured surface b, and obtains an angle β between the to-be-measured surface b and the reference plane c according to the normal vector.

In this exemplary embodiment, the normal vector of the to-be-measured surface b is: $\vec{b}$=(0, 0, 1).

Thus, the angle β can be obtained by following formula:

$$\cos\beta=\vec{b}*\vec{c}/(|\vec{b}|*|\vec{c}|)=C/\sqrt{A^2+B^2+C^2}$$

$$\beta=\arcsin(C/\sqrt{A^2+B^2+C^2})$$

Figure 6:
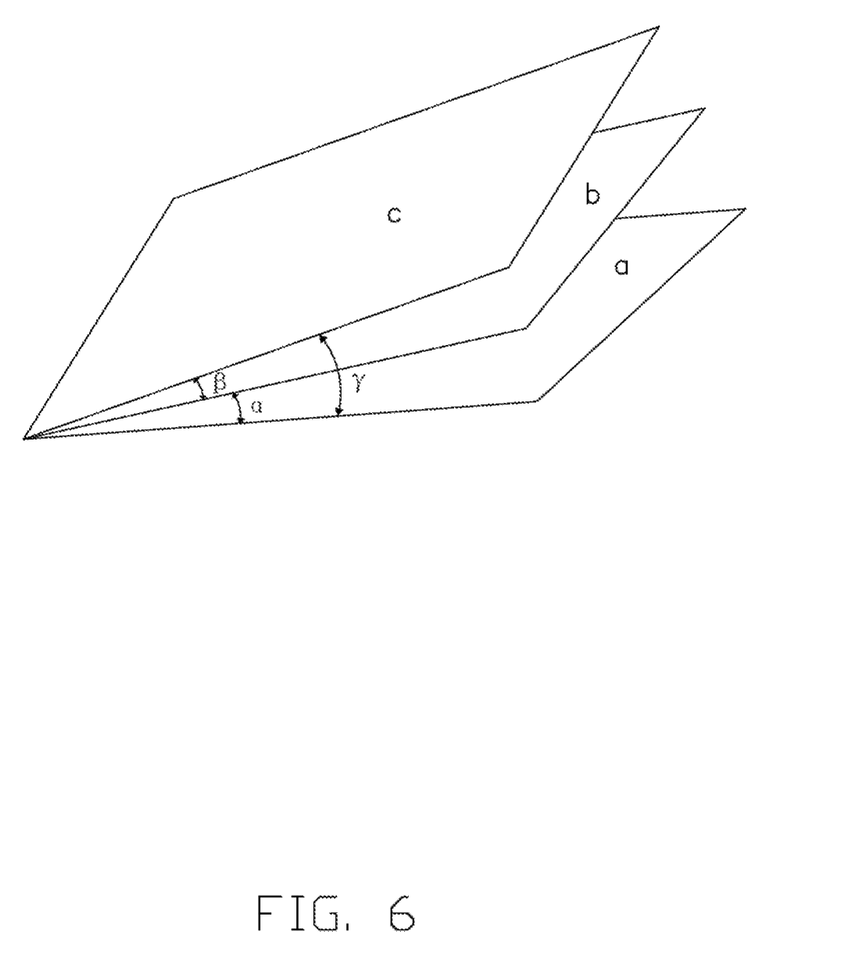
FIG. 6 is a diagram of angular relationship among the to-be-measured surface, a reference surface, and an absolute horizontal plane.

At step S07, referring to FIG. 6, the angle measurement controlling module 106 controls the angle detector 13 to measure an angle γ between the reference plane c and the absolute horizontal plane a.

At step S08, referring to FIG. 6, the second angle calculating module 107 calculates an angle α between the to-be-measured surface b and the absolute horizontal plane a according to the relationship among the absolute horizontal surface a, the to-be-measured surface b, and the reference plane c. Wherein, a reflects the levelness of the to-be-measured surface b. The angle α between the to-be-measured surface b and the absolute horizontal plane a is calculated by the formula α=γ−β.

At step S09, the display controlling module 108 controls the display 16 to display the levelness α of the to-be-measured surface b.

With the above configuration, no distance detector such as a plurality of sensors is needed, which reduces the cost of the levelness measuring device 1. Since non-contact measurement is performed on the to-be-measured surface b, the act of measuring has no influence on the to-be-measured surface b of the object, and some objects that cannot be directly contacted (such as high-temperature objects) can be measured.

The embodiments shown and described above are only examples. Many other details are found in such art such. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A levelness measuring method applied to a levelness measuring device, the levelness measuring device comprising a rail, a distance detector, and an angle detector, the distance detector and the angle detector positioned at the rail, the levelness measuring method comprising:
    establishing a three-dimensional (3D) coordinate system X-Y-Z to cause a to-be-measured plane to be in a place formed by X-axis and Y-axis of the 3D coordinate system X-Y-Z, and treating a plane of the rail as a reference plane;
    controlling the distance detector to move along the rail, measuring height variations between the rail and the to-be-measured surface along the X-axis and the Y-axis, to obtain a group of data (X,Z) and a group of data (Y,Z);
    inputting the groups of data (X,Z) and (Y,Z) into a rectangular plane coordinate system, and fitting the groups of data into two linear functions:

$$\begin{cases} a_1X + b_1Z + c_1 = 0 \\ a_2Y + b_2Z + c_2 = 0 \end{cases},$$

wherein, $a_1$, $a_2$, $b_1$, $b_2$, $c_1$, and $c_2$ are constant;
    processing the two linear function equations to obtain a plane equation of the reference plane, and calculating a normal vector of the to-be-measured surface according to the obtained plane equation;
    obtaining an angle β between the to-be-measured surface and the reference plane according to the calculated normal vector;
    controlling the angle detector to measure an angle γ between the reference plane and an absolute horizontal plane; and
    calculating an angle α between the to-be-measured surface and the absolute horizontal plane by a relationship among the to-be-measured surface, the reference plane, and the absolute horizontal plane, wherein α=γ−β, α reflects the levelness of the to-be-measured surface.

2. The levelness measuring method of claim 1, further comprising:
controlling a display to display the levelness of the to-be-measured surface.

3. The levelness measuring method of claim 1, wherein the angle detector is a three-axis gyroscope.

4. The levelness measuring method of claim 1, wherein the rail is L-shaped, and the plane equation of the reference plane is:

$$AX+BY+CZ+D=0,$$

wherein A, B, C, and D are constants.

5. The levelness measuring method of claim 4, wherein the normal vector is $\vec{c}=(A,B,C)$.

6. A levelness measuring device, comprising:
a rail;
a distance detector positioned at the rail;
an angle detector positioned at the rail;
at least one processor; and
a memory coupled to the at least one processor and storing one or more programs, wherein when executed by the at least one processor, the one or more programs cause the at least one processor to:
establish a three-dimensional (3D) coordinate system X-Y-Z to cause a to-be-measured surface to be in a place formed by X-axis and Y-axis of the 3D coordinate system X-Y-Z, and treat a plane of the rail as a reference plane;
control the distance detector to move along the rail, measure height variations between the rail and the to-be-measured surface along the X-axis and the Y-axis, to obtain a group of data (X,Z) and a group of data (Y,Z);
input the groups of data (X,Z) and (Y,Z) into a rectangular plane coordinate system, and fit the groups of data into two linear functions:

$$\begin{cases} a_1 X + b_1 Z + c_1 = 0 \\ a_2 Y + b_2 Z + c_2 = 0 \end{cases},$$

wherein, $a_1$, $a_2$, $b_1$, $b_2$, $c_1$, and $c_2$ are constant;
process the two linear function equations to obtain a plane equation of the reference plane, and calculate a normal vector of the to-be-measured surface according to the obtained plane equation;
obtain an angle β between the to-be-measured surface and the reference plane according to the calculated normal vector;
control the angle detector to measure an angle γ between the reference plane and an absolute horizontal plane; and
calculate an angle α between the to-be-measured surface and the absolute horizontal plane by a relationship among the to-be-measured surface, the reference plane, and the absolute horizontal plane, wherein α=γ−β, a reflects the levelness of the to-be-measured surface.

7. The levelness measuring device of claim 6, wherein the one or more programs further cause the at least one processor to:
control a display to display the levelness of the to-be-measured surface.

8. The levelness measuring device of claim 6, wherein the plane equation of the reference plane is:
AX+BY+CZ+D=0, wherein A, B, C and D are constants.

9. The levelness measuring device of claim 8, wherein the normal vector is: $\vec{c}=(A,B,C)$.

10. The levelness measuring device of claim 9, wherein a normal vector of the to-be-measured surface is: $\vec{b}=(0, 0, 1)$, the angle β is calculated according to the following formula:

$$\cos \beta = \vec{b} * \vec{c} / (|\vec{b}|*|\vec{c}|) = C/\sqrt{A^2+B^2+C^2}$$

$$\beta = \arcsin(C/\sqrt{A^2+B^2+C^2})$$

* * * * *